(12) United States Patent
Neyman et al.

(10) Patent No.: US 6,359,981 B1
(45) Date of Patent: Mar. 19, 2002

(54) VIRTUALIZED COMPUTER TELEPHONY INTEGRATED LINK FOR ENHANCED FUNCTIONALITY IN CALL CENTERS

(75) Inventors: Igor Neyman, Palo Alto; Myhailo Barskyy, San Mateo; Alec Miloslavsky, San Carlos; Oleg Bondarenko, San Francisco; Valeriy Issayev, San Bruno; Andrei Petrov, Palo Alto; Pavel Karpenko, Walnut Creek, all of CA (US)

(73) Assignee: Genesys Telecommunications Laboratories, Inc., San Francisco, CA (US)

( * ) Notice: Subject to any disclaimer, the term of this patent is extended or adjusted under 35 U.S.C. 154(b) by 0 days.

(21) Appl. No.: 08/950,253

(22) Filed: Oct. 14, 1997

Related U.S. Application Data

(60) Division of application No. 08/928,861, filed on Sep. 12, 1997, which is a continuation-in-part of application No. 08/869,815, filed on Jun. 4, 1997, which is a continuation-in-part of application No. 08/802,667, filed on Feb. 19, 1997, which is a continuation-in-part of application No. 08/797,420, filed on Feb. 10, 1997, application No. 08/950,253, which is a continuation-in-part of application No. 08/833,340, filed on Apr. 3, 1997, which is a continuation-in-part of application No. 08/891,675, filed on Jul. 9, 1997.

(51) Int. Cl.[7] .......................... H04M 7/00; H04M 3/00
(52) U.S. Cl. .......................... 379/265.09; 379/221.08; 379/265.01; 379/265.05; 379/265.11; 379/266.07
(58) Field of Search .................. 379/219, 230, 379/242, 258, 260, 262, 265, 266, 268, 198, 207, 265.01–266.1, 221.08, 221.09; 370/270, 352

(56) References Cited

U.S. PATENT DOCUMENTS

| 5,452,350 A | * | 9/1995 | Reynolds et al. ........... 379/220 |
|---|---|---|---|
| 5,703,943 A | * | 12/1997 | Otto ............................ 379/265 |
| 5,742,675 A | * | 4/1998 | Kilander et al. ............. 379/265 |
| 5,757,904 A | * | 5/1998 | Anderson .................... 379/265 |
| 5,838,682 A | * | 11/1998 | Dekelbaum et al. ......... 370/401 |
| 5,848,143 A | * | 12/1998 | Andrews et al. ............. 379/219 |
| 5,878,130 A | * | 3/1999 | Andrews et al. ............. 379/265 |
| 5,884,032 A | * | 3/1999 | Bateman et al. ....... 395/200.34 |
| 5,889,774 A | * | 3/1999 | Mirashrafi et al. .......... 370/352 |
| 5,901,203 A | * | 5/1999 | Morganstein et al. .... 379/88.02 |
| 5,903,631 A | * | 5/1999 | Smith et al. ............. 379/90.01 |
| 5,905,792 A | * | 5/1999 | Miloslavsky ................. 379/265 |
| 5,960,073 A | * | 9/1999 | Kikinis et al. .............. 379/265 |
| 5,987,102 A | * | 11/1999 | Elliott et al. ............. 379/93.17 |
| 6,026,087 A | * | 2/2000 | Mirashrafi et al. .......... 370/389 |
| 6,046,762 A | * | 4/2000 | Sonesh et al. ................ 348/16 |

OTHER PUBLICATIONS

Definition of "Internet", FNC Resolution, Oct. 24, 1995.*
Definition of "Internet", FNC Resolution, Oct. 24, 1995.*

* cited by examiner

Primary Examiner—Allan Hoosain
(74) Attorney, Agent, or Firm—Donald R. Boys; Central Coast Patent Agency, Inc.

(57) ABSTRACT

A telephony call center has agent workstations having telephones connected to station-side ports of a telephone switching apparatus adapted to receive and switch conventional telephone calls to the telephones, and also computer platforms connected on a local area network (LAN). A processor also connected on the LAN has a wide area network (WAN) port and is adapted to receive and distribute computer-simulated telephone calls from the WAN to computer platforms at the agent stations. At individual agent stations the telephone and computer platform is connected by a Telephone Application Programming Interface (TAPI)-compliant bridge. Status of calls of both types at agent workstations is communicated to a network-level router by the processor having a WAN connection, which may also receive computer-simulated calls. The router may then make routing decisions based on agent status relative to both kinds of calls.

5 Claims, 8 Drawing Sheets

Sample of broadcast announcement record

Sample User Interface Screen

VIRTUALIZED COMPUTER TELEPHONY INTEGRATED LINK FOR ENHANCED FUNCTIONALITY IN CALL CENTERS

CROSS-REFERENCE TO RELATED DOCUMENTS

The present application is a Divisional application of copending patent application Ser. No. 08/928,861, filed Sep. 12, 1997, which is a Continuation-In-Part (CIP) of prior copending patent application Ser. No. 08/869,815, filed Jun. 4, 1997 which is a CIP of copending application Ser. No. 08/802,667, filed Feb. 19, 1997 which is a CIP of copending patent application Ser. No. 08/797,420, filed Feb. 10, 1997. The present application is also a CIP of copending application Ser. No. 08/833,340, and of a copending application having an application Ser. No. 08/891,675, filed Jul. 9, 1997. Titled "Methods in Computer Simulation of Telephony Systems."

FIELD OF THE INVENTION

The present invention is in the area of telephone call processing and switching, and pertains more particularly to intelligent call-routing systems, and equipment and methods for customizing and Personalizing Routing Rules and Protocol.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventor and to those with skill in the art in general. For this reason, much minute detail of known systems is not reproduced here, as to do so would obscure the facts of the invention.

One document which provides considerable information on intelligent networks is "ITU-T Recommendation Q.1219, Intelligent Network User's Guide for Capability Set 1", dated April, 1994. This document is incorporated herein by reference.

At the time of filing the present patent application there continues to be remarkable growth in telephone routing systems, with routing done both at or near point-of origin of incoming calls, and at call destinations. For example, systems are known to the present inventor that perform initial call processing before routing an incoming call to a destination switch, and further routing is done at the call destination in computerized telephony equipment, often termed customer premises equipment (CPE). The present invention pertains most particularly to routing at customer premises.

There are, at the time of the present patent application a considerable range of CPE systems available for use from various manufacturers, and, as state-of-the-art routing systems are typically computerized, there is a broad variety of software available for such systems as well. It is the software in general wherein routing rules are set, and the routing rules determine the decision-making paths a system follows in routing calls.

In current art, although there are widely varying systems in the art relative to routing rules, all such systems exhibit a common drawback. Typically such systems, once set up (programmed) to follow certain routing rules and practices, cannot easily vary, and individual users or groups of users, cannot change the rules arbitrarily. To tinker with the routing rules in CPE typically requires a highly-trained maintenance technician (system administrator).

What is clearly needed is method and apparatus which allows an individual user of a routing system, or a group of users, to alter and customize the routing rules of the system for particular purposes, which may change from time to time, depending on the users.

SUMMARY OF THE INVENTION

In a preferred embodiment of the present invention a telephony call center is provided, comprising a plurality of agent stations, individual ones of the agent stations having a telephone having a telephone line port, and a computer platform; a local area network (LAN) connecting at least some of the computer platforms at the agent stations; a processor on the LAN having a connection to a wide area network (WAN) adapted for computer-simulated telephony; and a Telephone Application Programming Interface (TAPI)-compliant bridge circuit between the telephone and the computer workstation in at least one of the agent stations. The call center receives telephone calls at the telephones at the agent stations, and also receives computer-simulated telephone calls at the WAN connection, and distributes the computer-simulated calls to computer platforms at the agent stations.

In preferred embodiments the WAN is the Internet, and computer-simulated calls are Internet Protocol Network Telephony calls. Also in some embodiments the TAPI-compliant bridge may be used to monitor telephone status and activity by the computer workstation, which may report the monitored status and activity on the LAN to the processor on the LAN having a WAN connection. Further, the processor having the WAN connection may report status at the call center to a router at network level.

In still other embodiments there may be a data server connected on the LAN, the data server comprising a caller database, wherein data associated with incoming calls is used as a key to retrieve data associated with callers from the caller database, and the data is displayed on video display units (VDUs) of the computer platforms at individual agent workstations. Agent scripts may also be stored in a database, and displayed on agent's VDUs according to data associated with incoming calls.

In another aspect of the present invention an agent station for a call-in center is provided, comprising a computer platform having a first communication port and a local area network (LAN) adapter, and adapted to receive and interact with computer simulated telephone calls; a telephone having a telephone line port and a second communication port; and a Telephone Application Programming Interface (TAPI)-compliant bridge connecting the second port of the telephone with the computer platform. In this embodiment the computer workstation is adapted to monitor transactions and status of the connected telephone via the TAPI-compliant bridge, and to report the transaction and status on a LAN via the LAN adapter. The computer workstation is, in preferred embodiments, a multi-media personal computer (PC) having a video display unit (VDU). In some embodiments an agent may utilize the TAPI-connected telephone to interact with computer-simulated telephone calls.

In yet another aspect a method for routing calls to individual ones of agent workstations in a call-in center adapted to receive conventional calls to telephones at the agent workstations and computer-simulated telephone calls to computer platforms at the agent workstations is provided, comprising steps of (a) connecting telephones at the agent workstations by a Telephone Application Programming Interface (TAPI)-compliant bridge circuit to the computer platforms at the agent workstations; (b) reporting by the computer platform at agent workstations to a network-level router the status of simulated calls at the computer platform and telephone calls at the telephone, monitored via the TAPI-compliant bridge; and (c) making routing decisions at the router based in part on the reported status of both kinds of calls.

In various embodiments of the invention taught in enabling detail herein, methods and apparatus are provided for handling both computer-simulated telephone calls and conventional calls at a call center, and also for making intelligent routing decisions at network level to such a call center.

BRIEF DESCRIPTION OF THE DRAWING FIGURES

DESCRIPTION OF THE PREFERRED EMBODIMENTS

Figure 1:
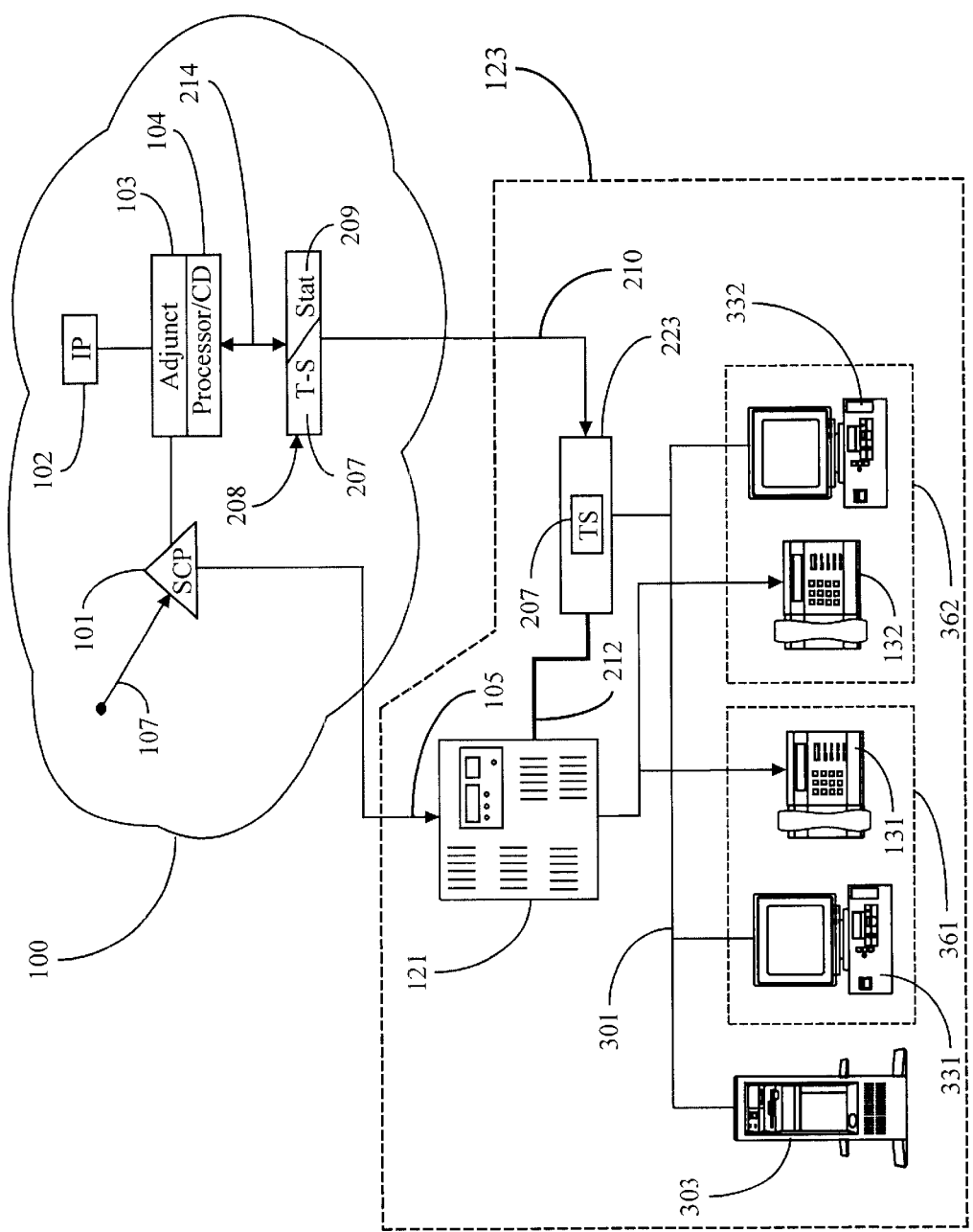
FIG. 1 is a system diagram of a call-routing system in an embodiment of the present invention.

FIG. 1 is a system diagram of a call-routing system according to a preferred embodiment of the present invention. Dotted lines 123 enclose elements of the system native to a customer's premises (CPE). This equipment in a preferred embodiment comprises a computerized telephony central switch 121 connected by a data link 212 to a processor 223 running an instance of a unique telephony server (T-Server) T-S 207. Switch 121 in conventional art distributes incoming calls (on line 105) to connected telephones, such as telephone 131 at a workstation 361 and telephone 132 at a second workstation 362. In various embodiments of the present invention T-Server 207 running on processor 223 exerts controlling influence on routing of incoming calls, as is described in further detail below.

In various embodiments of the present invention each workstation (361, 362) has a PC with a video display, such as PCNVDU 331 at workstation 361 and PCIVDU 332 at workstation 362. There will be in most architectures many more than the two telephone workstations shown, each with an associated PC, but two are considered adequate by the inventors to illustrate embodiments of the present invention.

PCNVDUs 331 and 332 in various embodiments are connected on a local area network (LAN) 301 which also connects to a data file server 303 and to processor 223 running an instance of T-Server 207. The arrangement of PC/VDU plus telephone at each workstation is a common arrangement for many company facilities, and has become more common as more and more people become computer literate. Moreover, many companies are actively training employees in use of computers, and providing PC-type computer equipment, usually interconnected by company LAN, for employees to use.

In the exemplary system shown, calls may originate at any remote call-in point, which is represented in FIG. 1 by region 100, referred to herein as the network cloud. Network cloud 100 may be a small regional portion of the world-wide network of connected telephony equipment, or may represent the entire world-wide network. An incoming call at any point in network cloud 100 is represented by vector 107 to service control point (SCP) 101 (typically a telephony central switch), which in this example is connected to an adjunct processor 103 and coupled thereby to an intelligent peripheral (I-P) 102, a distribution processor 104 and a processor 208 running a second instance of unique T-Server 207 as well as a statistical server (stat-server) 209. In this system calls are forwarded to switch 121 at the customer premises equipment over telephone line 105, and associated data is forwarded in parallel to processor 223 over a digital network link 210. Such systems, wherein data associated with a call is forwarded on a separate link from the call itself, are, to the inventor's knowledge at the time of the present patent application, not known in the art, but are known to the inventor. This feature, however, is not required in practice of the present invention, but preferred in some embodiments.

In embodiments of the present invention a call originating in the network cloud and routed to switch 121, destined for one of telephones 131 or 132 or to another destination at the customer's premises, typically carries a destination number, which may include a direct inward dialing (DID) feature, whereby a limited number of lines may be used to carry calls to a larger number of final destinations, accomplished principally by software techniques. Destination may also be to a virtual number, of which many may be programmed, and T-Server 207 may be adapted to further route calls forwarded to such virtual numbers. The phone call may also have caller ID attached (originating caller's phone number), and in those cases wherein a separate network digital data link is accomplished between processors at the origination end (208) and the customer's premises (223)cases a data packet associated with the call may be forwarded over link 210. Also, T-S 207, which interacts continuously with switch 121 in this embodiment, is capable of transacting with data file server 303, given caller ID and/or other data associated with a call, to retrieve further information about the caller from data file server 303.

It will be apparent to those with skill in the art that incoming calls are not limited to two telephones as shown in FIG. 1. There may be many more than two telephones connected to switch 121, other telephony equipment, such as facsimile equipment and data lines may also be connected and involved in routing decisions and transactions according to embodiments of the present invention. Moreover, existing techniques, such as virtual expansion for routing calls with a certain number to multiple destinations on some pre-programmed protocol may also be involved. The simple diagram of a switch with two telephones connected is meant to be illustrative for description of embodiments of the present invention.

It will be apparent to those with skill in the art as well, that a separate processor shown as processor 223 in FIG. 1, is not strictly required in embodiments of the invention, depending on the level of machine intelligence and sophistication of switch 121. Switches for customer premises continue to be developed with new levels of intelligent capability, and some may be capable of interacting with other elements of the present invention without a separate processor between the switch and a LAN such as LAN 301. Processor 223 will be required to practice various embodiments of the invention with many existing telephony switches which may be used as element 121. In virtually all cases in practicing the present invention, an instance of unique T-Server 207 executing on a computerized platform will be required.

In a preferred embodiment of the present invention routing intelligence is no longer confined to a central location such as telephony switch 121 or T-Server 207 running on a connected processor,, but distributed in a manner that individual users of the system may customize routing at their own workstations, using individual PCs. This is accomplished in large part by control code executable at a user's computer workstation. It is not required that the actual code be always at the user's workstation, as it may be shared code resident at, for example a file server on LAN 301, such as file server 303. The unique code may be accessed from such a server and executed at any one of several workstations such as workstations 361 and 362 by PC/NDU 331 and PCNVDU 332 respectively. The location of stored code, and access to such code is not, however germane to the invention. In embodiments of the invention, an individual PC executes unique code to provide call-routing control for an individual.

In embodiments of the present invention, T-Server 207 is adapted to cooperate with code executed at individual PCs to route incoming calls. In this unique routing process there are at least two different mechanisms that may be used. In one mechanism, all calls are routed to a single routing point, and each individual routing application registers with that routing point. In this case a record of each call is broadcast on LAN 301, as will be described more fully below, and filtering occurs at each PC router. In a second mechanism there may be a virtual routing point for each PC using a personal router on the LAN. In this second case there is no need to broadcast call particulars on the LAN. This second alternative is typically more expensive than the first, and there are currently rather severe limitations on how many automatic call distribution (ACD) queues or routing points may be allocated on a typical central switch.

Figure 2:
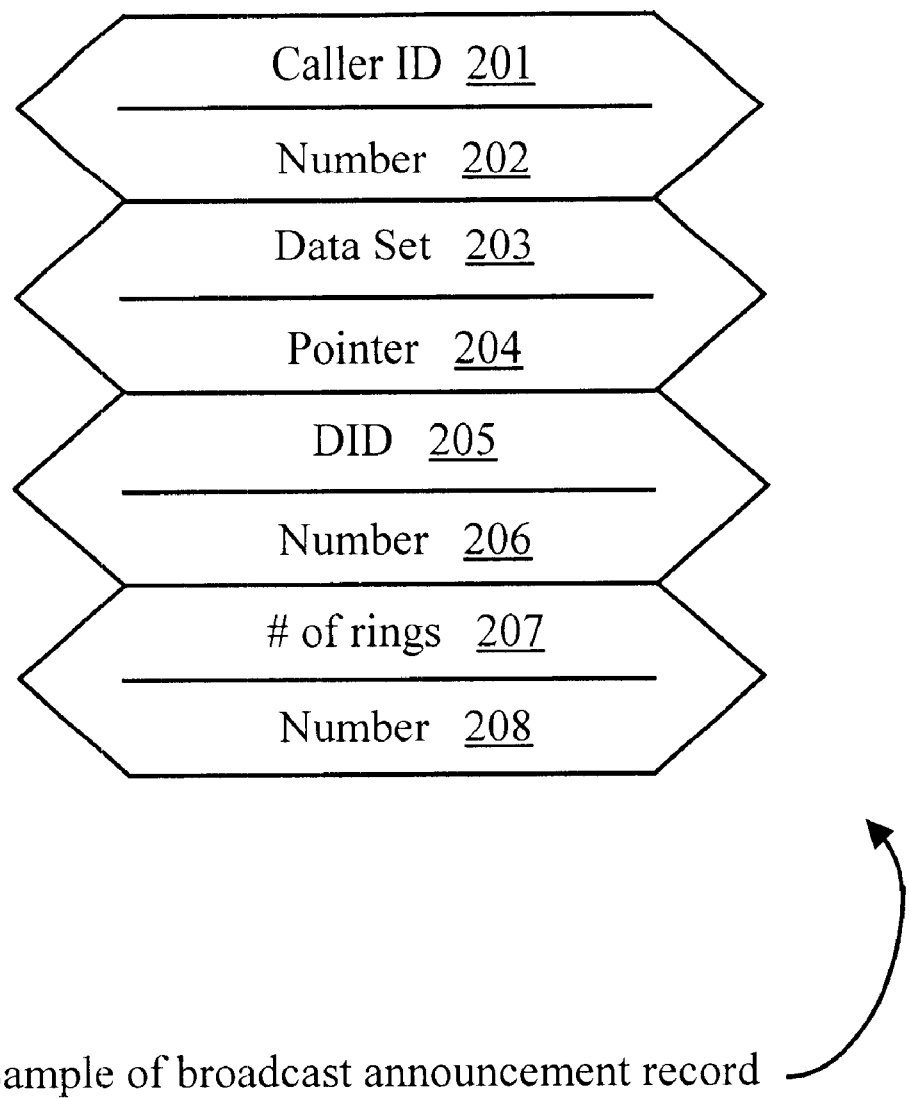
FIG. 2 is a sample of a broadcast announcement record in an embodiment of the present invention.

Referring now to FIG. 2, and presuming the first of the two mechanisms described immediately above, with each incoming call, an overall record of the call, prior to routing, is broadcast on LAN 301. This overall record can take a number of different forms, of which the example in FIG. 2 is just one exemplary form. In this example the overall record consists of four data portions. One data portion consists of elements 201 and 202. Data element 201 identifies this portion as the caller ID associated with the incoming call, and element 202 is the caller ID number. A second data portion consists of data elements 203 and 204. This portion is a data set which may be transmitted via link 210 to processor 223 in parallel with the incoming call, or may be composed partly of data retrieved from server 303, using other call data as a pointer. Element 203 identifies the data as a data set, and element 204 is the pointer. Similarly elements 205 and 206 constitute a direct inward dialing (DID) number, and elements 207 and 208 fix number of rings.

A central element in the present invention is that a user at an individual PC runs an instance of a personal router application, providing that user with instant and complete control over routing of calls meant for that user (or, in some cases, associated users). The user's PC, such as PCNVDU 331 is connected typically by LAN to a processor such as processor 223, in turn connected to the central switch, such as switch 121.

At the computer portion of an individual workstation, such as PCNVDU 331 at workstation 361, the user has access to the local application which is interactive with code executed at T-Server 207 at processor 223, to control and customize routing for incoming calls, depending on certain data elements in the broadcast announcement record (FIG. 2). As a part of this unique capability to program routing responses, the individual user may in some embodiments load to his/her VDU a unique user interface, an example of which is shown in FIG. 3.

Figure 3:
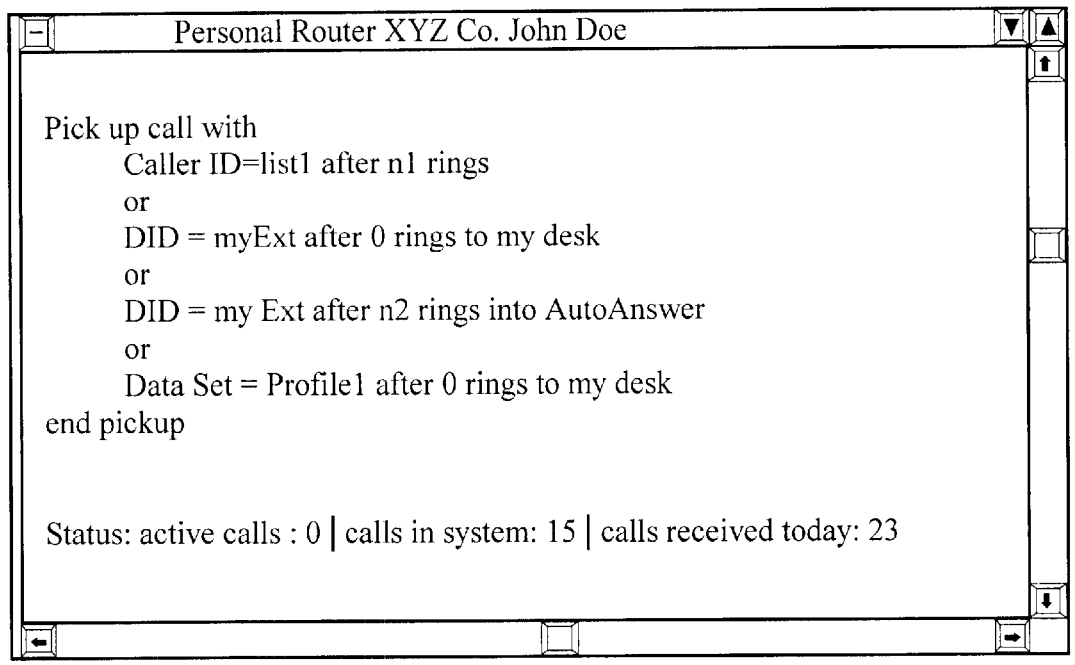
FIG. 3 is a sample user interface screen in an embodiment of the present invention.

FIG. 3 illustrates a window presentable to a user at an individual workstation, compatible, for example, with Windows operating systems. This is an input and display interface for a personal router, a variation of which may be assigned to each of selected employees to provide these individuals with an ability in conjunction with the premises telephone equipment to customize and periodically adjust the routing of certain incoming calls. In this example, the interface is for company XYZ and limited to employee John Doe.

Through the individual interface, John Doe in this instance, may program in a relatively high-level language, routing preferences for certain incoming calls, according to data broadcast for such calls on LAN 301. In the case where each user has a dedicated routing point, an incoming call is directed to the individual's computer, and the broadcast is not necessary.

In this example John Doe has programmed his interface to pick up all calls having Caller ID matched with a list "list1" after n1 rings. List1 is resident in John Doe's database associated with his own Personal Router, and John Doe may call up this list and amend, delete, and expand it as he wishes. The number of rings n1 may be any convenient number to accomplish John's purpose.

John Doe may program negative lists as well. Although not specifically recommended, a negative list could be used to hang up on all calls that have an ID associated with a company or individual that has been making harassing calls to an employee, or to shunt such calls to a special tracking program or the like.

John Doe in this instance has also programmed his personal router to send all calls bearing his assigned DID number to the telephone at his desk after 0 rings, and to an answering machine after n2 rings. Associations with data sets may also be made, comparing such data sets to stored profiles and the like. At the bottom of the display in this example a status summary of calls may be provided. A user may choose to have this window resident on his computer screen as a pix-on-pix, or to hide it and call it as needed. Also, it will be apparent to those with skill in the art that it is not strictly required that each selected person having an associated routing interface assigned have a computer at his/her elbow. For those persons not, for one reason or another, inclined to program their own routing, the interface may be called up and done by another, with appropriate access security applied. A secretary or system administrator may perform such functions, using any workstation connected to company LAN 301.

The user interface at the user's workstation can take any of a variety of forms, and have a variety of functionality. Typically, when the user logs on, his system will be configured to execute the unique application to run in the background, and to monitor for incoming calls at all times the user is present and active. It will be apparent to those with skill in the art that this can be done in a variety of ways. The interface, for example, may be a Graphic User Interface (GUI) wherein icons may be used to represent calls, callers, and other users, and the individual user at one workstation may select to display icons as desired. In this alternative embodiment an incoming call may appear on a user's PC VDU as a small telephone in an announcement bar. Such announcement bars are familiar to those with skill in the art, such as seen on Operating System Desktops, where an e-mail arrival may be indicated by a letter icon and a sound.

In such an embodiment, by moving the screen cursor to the telephone icon, which may be programmed to "ring" or to vibrate as though it is ringing, the user may activate a text balloon announcing the caller ID or other call data, or such data may be displayed directly in the icon. The system can be configured in such an embodiment to allow the user to route the call to his own phone with a click, to hang up with a double click, to drag the call to a holding queue (represented by a basket, for example,) to send the call to an answering machine, which may be done by dragging and dropping the telephone icon to an answering machine icon, to transfer the call to another person by dragging and dropping the telephone icon to an icon representing another user (such as the instant user's secretary or supervisor for example). Those with skill in the art will recognize that the functionality through the use of click and drag-and-drop procedures is very broad indeed.

Actions taken at the personal router interface at an individual PC on LAN 301 in embodiments of the present invention are codified as instructions on the LAN to T-Server 207 (in most cases) running on a processor such as processor 223, connected to central switch 121. If an individual user at a workstation, for example, has received an indicator of a waiting call, and has dragged the ringing telephone to his secretary's desk icon in his interface, his personal router interacts with T-Server 207 to instruct switch 121 to reroute the call to the secretary's telephone. In a similar manner, most actions at a personal router become instructions to switch 121, and in general each user having access to such a personal router can program responses to calls and respond to incoming calls in real time with a broad set of available responses.

In embodiments of the invention, not necessarily all calls are routed by personal routers executed on PCs on LAN 301. There may also be over-riding routing rules programmed into switch 121, such that certain calls or types of calls are always handled in a certain way. Rules in switch 121 may also determine the fate of calls that are not eventually routed by personal routers. For example, all calls alive after seven rings may be switched to a recorded announcement, and the like. In this manner a very broad freedom of routing may be accomplished, with security and flexibility to adapt for changes in the organization.

It will be apparent to those with skill in the art that the division of code and functionality between server 303, T-Server 207 running on processor 223, and individual workstations on the LAN is somewhat arbitrary, with the requirement that individuals at the workstations have interface access to customize and update personal routing rules.

In another aspect of the present invention a Personal Desktop Router is implemented in a Client-Server architecture. This embodiment is illustrated with the aid of FIG. 4. In this embodiment a router 401 is provided and executes on processor 223 which also executes an instance of T-Server 207. Router 401 in this instance is a central router having routing rules divided in sections dedicated to each assigned user or DN on LAN 301. Unique Client Interface Packages represented by elements 401a and 401b are provided at individual workstations such as workstation 361 and workstation 362 connected to LAN 301. Client Interface Packages 401a and 401b are for the purpose of allowing users at the workstations to edit their own personal routing rules, much as has been described above for personal routers according to embodiments of the present invention, wherein the routers execute at the workstations.

In this Client-Server embodiment of the present invention, the actual router software exists and executes as one router 401. Client Packages 410a and 410b may be implemented as a Graphical User Interface (GUI) with iconic drag and drop features as described above with reference to FIG. 1, or may be of another suitable type designed to allow interaction with router 401.

It will be apparent to one with skill in the art that router 401, in this embodiment, is not required to reside in processor 223, but may reside in any other machine capable of executing the router and connected or coupled to LAN 301, such as switch 121. The router could be executed, for example, on a server 1201 on the Internet 1200, as shown in more detail in FIG. 7, and accessed by a WEB browser by a client connected to LAN 301. It will also be apparent to one with skill in the art that while router function does not occur at individual workstations 361 and 362 in this particular embodiment, editing capabilities provided to the user via client packages 401a and 401b can remain essentially the same as described in previous embodiments taught herein.

In typical embodiments, router 401 is configured to allow a group manager or system agent to perform higher level configurations to routing rules, such as type of calls available, call parameters, user function or location changes, etc., while individual users may, through their interfaces, configure routing rules for their own calls, within the boundaries set by the supervisor.

It will be apparent to one with skill in the art that any configurational division of editing capabilities may be employed with reference to routing rules as they may exist in any given application without departing from the spirit and scope of the present invention. A server-based router such as router 401 in this embodiment, wherein a unique client package is provided for editing purposes at a user's workstation, such as workstation 361, is heretofore unknown to the inventor.

Figure 4:
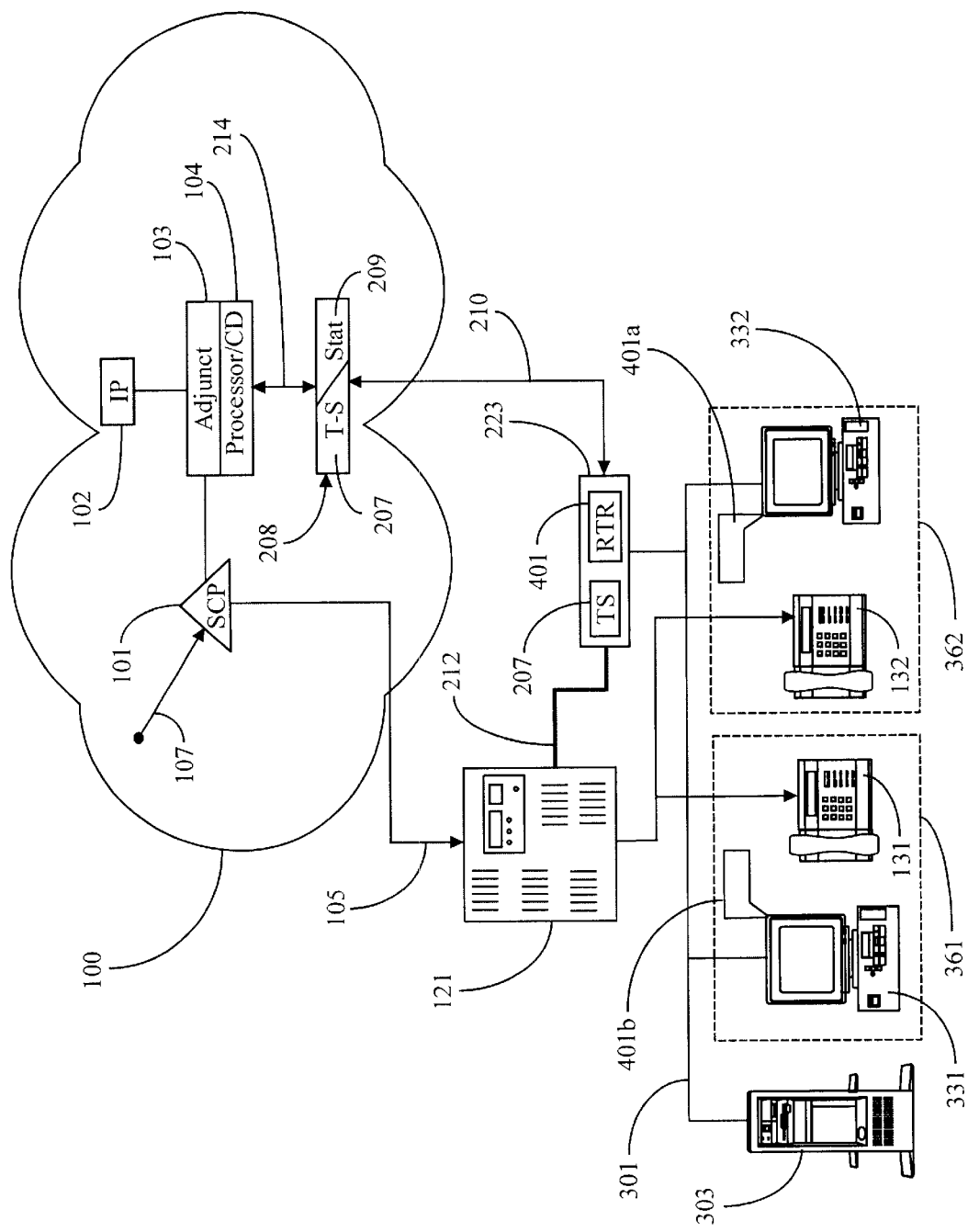
FIG. 4 is a system diagram of a call-routing system implemented in client-server mode in an embodiment of the present invention.

In the embodiment illustrated by FIG. 4 communication over analog lines 105 and data link 210, and other functions of the system, is essentially the same in method as is illustrated in FIG. 1 and described above with reference to FIG. 1. Also, network cloud 100 and the components therein are essentially the same as in the embodiment in FIG. 1. For this reason much detail as to the dynamics of and paths of communication in an embodiment of the present invention with respect to FIG. 4 are not repeated here.

Virtualized Computer-Telephony Integrated Link (3211–3213)

Figure 5:
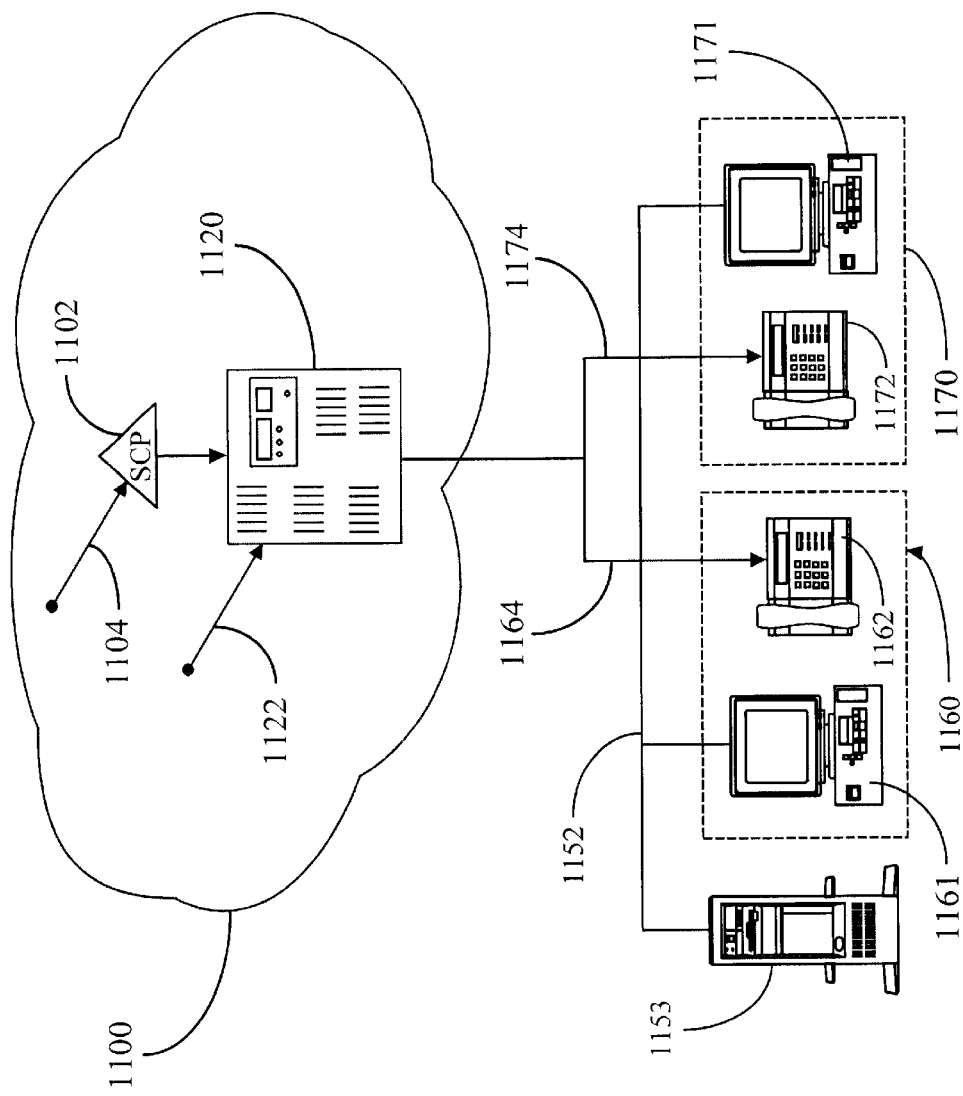
FIG. 5 is a block diagram of a call-routing system in the prior art.

To help create a context for a detailed description of preferred embodiments of the present invention which follow, attention is first directed to FIG. 5, which is a block diagram of a call-routing system in the prior art. In the system of FIG. 5 a call-in center 1150 is illustrated having two telephones 1162 and 1172. As was described above in the background section, the present invention is particularly adaptable to such call-in centers wherein a telephony switch is not a part of the equipment at the call-in center, thus no telephony switch is shown in FIG. 5 at call-in center 1150.

It will be apparent to those with skill in the art that there may be just one phone in call-in center, or there may be several more than the two shown. Two telephones is an arbitrary choice for purposes of illustration and description.

It is common and desirable at call-in centers for agents who man the phones to have at hand a personal computer (PC) or a data terminal of some description including a video display and processor. Access to such a computerized system allows the agent to recall and display data pertaining to a caller, and also other information of use in dealing with and helping caller, such as technical information about products and product use. Although several types of such data terminals are known, PCs are assumed here for purposes of description and illustration. A PC 1161 with a display is shown at hand for an agent using telephone 1162 and a PC 1171 is shown proximate telephone 1172 for use by an agent at telephone 1172.

In a very simple system there may be just one telephone and one PC proximate the telephone, therefore just a single equipped agent constituting the call-in center. In the system of FIG. 5 having two telephones, there are also two PCs. Each PC and associated telephone is considered here to constitute an agent station. Agent station 1160 comprises telephone 1162 and PC 1161, and agent-station 1170 comprises telephone 1172 and PC 1171.

In systems of the sort depicted by FIG. 5, having two or more agent stations, it is desirable that the PCs be connected in a Local Area Network (LAN), and this connectivity is shown in FIG. 5 with PCs 1161 and 1171 connected on a LAN 1152 wherein a data file server 1153 is also connected. Data file server 1153 in this system is the repository of customer data and the like accessible to agents manning the phones. Though not shown in FIG. 5 it will be apparent to those with skill in the art that there may be other servers on the LAN or elsewhere in the network as known in the art.

Telephone calls in the system of FIG. 5 are provided to telephone 1162 on line 1164 and to telephone 1172 on line 1174 from essentially anywhere represented by network cloud 1100. Cloud 1100 could represent a relatively small local calling area, a regional area, a single phone company or even the phone system of the entire planet. Calls are forwarded by telephony switches represented by telephony switch 1120.

Calls 1104 intended specifically for call-in center 1150 typically are received at Service Control Points (SCP) represented by SCP 1102, which are organized typically with one or more 800 numbers or the like. Calls received and processed at SCP 1102 are forwarded to switch 1120 which routes the calls to whatever area code and number is assigned to telephones 1162 and 1172. Other calls 1122 may also come into telephony switch 1120 and be routed to call-in center 1150. As is known in the art, SCP 1102 is also a telephony switch.

Also as is known in the art, there may be equipment associated with SCP 1102 to provided some additional functionality, such as an adjunct processor and an intelligent peripheral. For simplicity's sake these are not shown in FIG. 5, but FIG. 5 may be considered as typical of many prior art systems. In the rather simple system of the prior art represented by FIG. 5 some data (such as caller ID for example, and Dialed Number Information Service {DNIS}), may be associated with calls forwarded to call-in center 1150. Such data to be useful in the system of FIG. 5 must be received by specialized equipment, such as familiar caller-ID boxes or telephone sets adapted to use the information being sold to people for home and business use.

Figure 6:
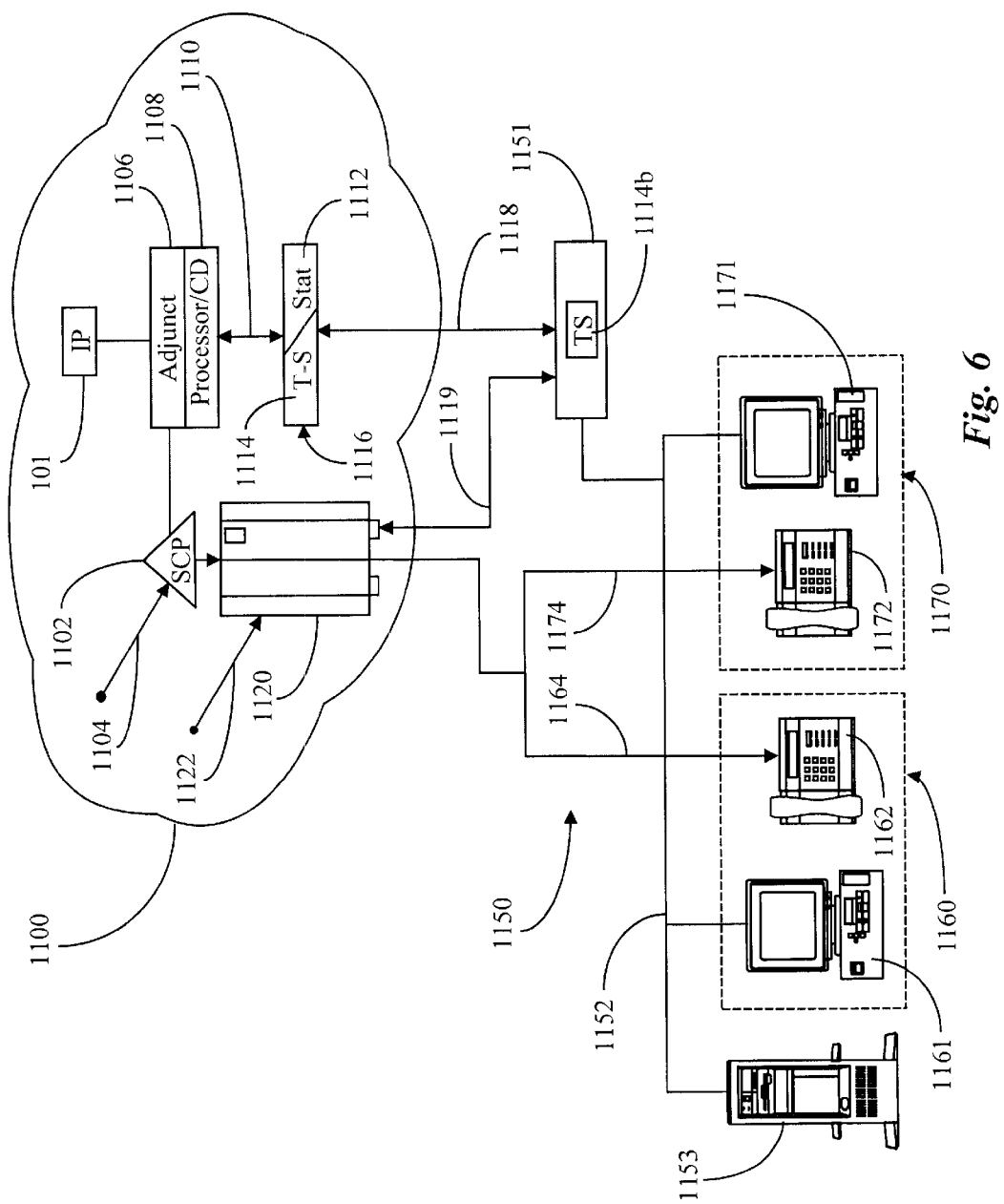
FIG. 6 is a block diagram of a call-routing and call-in system according to embodiments of inventions known to the present inventors.

Attention is now directed to FIG. 6, wherein a call-in system known to the present inventors is illustrated. In this system SCP 1102 receiving calls 1104 intended for call-in center 1150 has a connection to an adjunct processor 1106 in communication with both an intelligent peripheral 1101 and a call-distribution processor 1108. There is further a processor 116 connected by a two-way communication link to call-distribution processor 1110. Processor 1116 comprises an instance of a unique application termed by the inventors a Telephony Server 1114, or T-Server, and a Statistical Server (Stat-Server) 1112. T-Server 1114 and functions provided by the T-Server are described in detail in the related patent applications listed above and incorporated herein by reference.

In the system of FIG. 6 a processor 1151 is provided at call-in center 1150, running a second instance of T-Server application 1114. Processor 1151 is coupled to processor 1116 in network cloud 1100 by a network link 1118, and to LAN 1152 by a network adapter. There is in addition a CTI connection 1119 between telephony switch 1120 in network cloud 1100 and processor 1151 at call-in center 1150. CTI connection 1119 may be an ISDN link or other data-type connection allowing transfer of CTI data and commands.

In the system of FIG. 6 information garnered in initial processing with use of IP 1101 may be provided by T-Server 1114 at processor 1116 to T-Server 1114 running on processor 1151 at the call-in center. This data can be used, then, ahead of a routed call, to, for example, to extract further data regarding a caller from a customer data base in file server 1153, and to provide the transferred and retrieved data at the PC display, such as PC 1161, proximate the telephone to which a call has been routed, for use by the agent manning that telephone.

Further, CTI transactional data retrieved from switch 1120 (line busy, line available, and the like), may be provided to T-Server 1114 at processor 1116, and in some cases in raw or processed form to Stat-Server 1112 to be used in routing by CD processor 1108. Many other functions described in the related applications listed above may now also be accomplished. Still further, Stat-Server 1114 running on processor 1151 can issue CTI commands to switch 1120 in the network cloud via CTI link 1119.

Although the system of FIG. 6 may be used to provide many CTI functions, there is a great dependence on telephony switch 1120. Some older switches are not capable of CTI functions and data sharing, and some others are very limited in their functions. Moreover, the organization that provides a call-in center under these circumstances has no control over the switches in the network cloud, and it may not be practical for such an organization to purchase and install an expensive CTI-capable switch on the premises of the call-in center. What is needed is an apparatus and methods that will provide CTI functionality in the absence of a workable CTI link, such as link 1119 in FIG. 2.

Virtual CTI link

Figure 7:
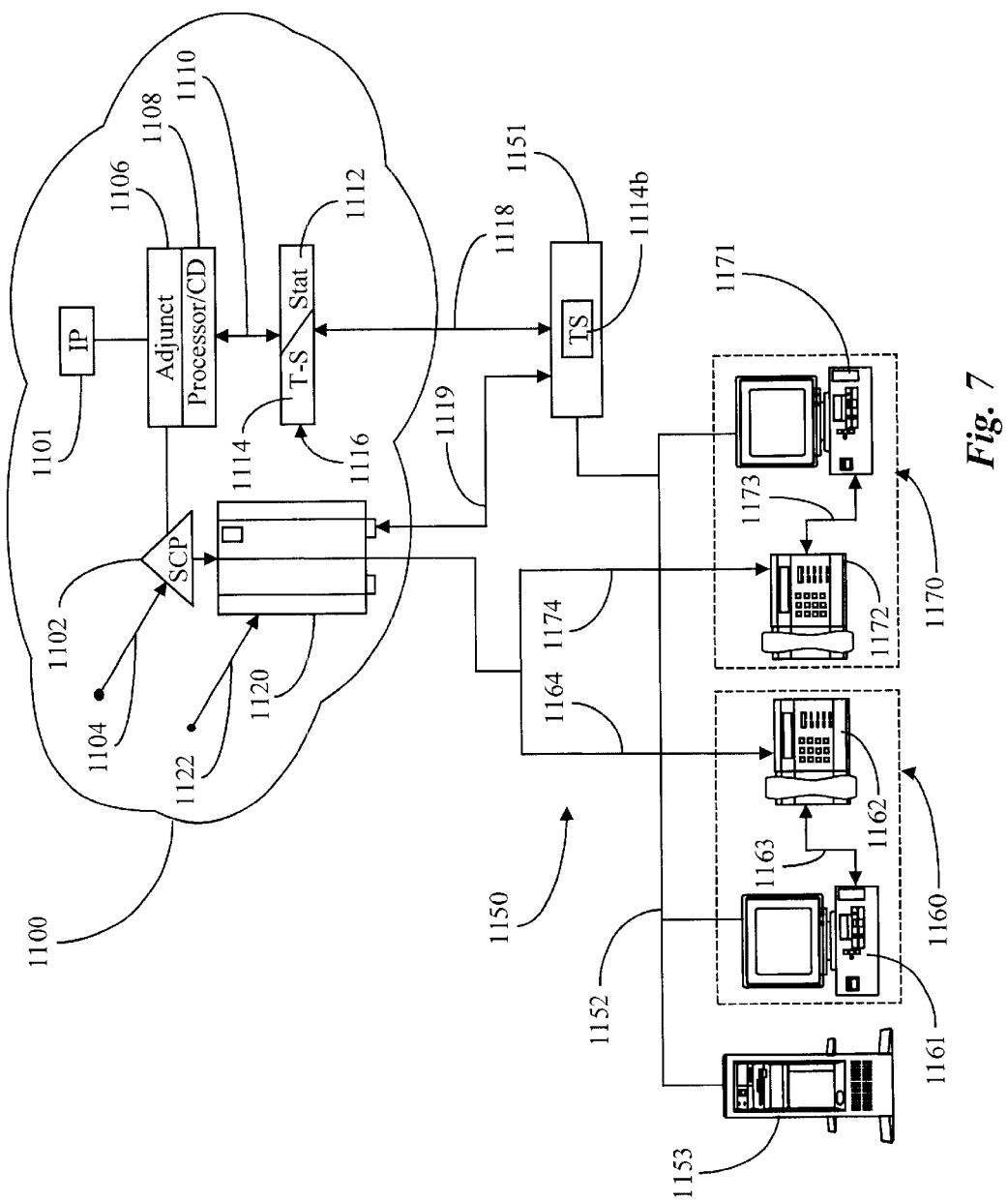
FIG. 7 is a block diagram of a call and information routing and call-center system according to an embodiment of the present invention.

FIG. 7 is a block diagram of a call and information routing and call-center system according to an embodiment of the present invention. The system of FIG. 7 has all of the connectivity and functionality of the system of FIG. 6, plus a data connection between each telephone in the call-in center and the associated PC. For example, in FIG. 7, PC 1161 is connected to telephone 1162 by link 1163, and PC 1171 is connected to telephone 1172 by data link 1173. Moreover, as previously described, each PC is connected on LAN 1152, which also connects to file server 1153 and to processor 1151 running an instance of T-Server 1114.

There are a number of different ways a telephone and PC may be connected, such as by a serial port and circuitry in the telephone and operating code in the PC such that the PC may monitor transactions of the telephone, including on-hook, off-hook, incoming caller-ID, ringing instance, and so forth. The PC via the data link may also exercise control over telephone functions. With this unique connectivity and adaptation, assuming all of the telephones in a call-in center are thus connected and adapted, T-Server 1114 running on processor 1151 may acquire in aggregate all of the information otherwise available from switch 1120 via CTI connection 1119. T-Server 1114 on processor 1151 may then perform as though a fully workable CTI connection 1119 to switch 1120 is established.

Call and Data Correspondence

One of the important functions performed is identification of callers, retrieval of data relating to callers, and transmittal of such data to be displayed at the PC associated with each telephone at each agent station. The advantage to all is readily apparent. The agent fielding a call is thus more prepared to deal with the caller, and will have information readily at hand.

To provide the call and data display functionality desired it is, of course, necessary that a caller's identity be established and the caller's correct data be retrieved for display. There are some instances in the system depicted in FIG. 7 and described herein, wherein such correspondence may be a problem. Consider, for example, the circumstance wherein an original call has been routed to telephone 1162. The origination of the call and caller ID are not available in the system of FIG. 7 (with a non-functioning link 1119) until the call is connected to telephone 1162. At that point the necessary information is transferred to T-Server 1114 at processor 1151, and data specific to the caller may be retrieved and displayed at PC 1161.

Consider now the further circumstance that after the agent answers and the data retrieval begins, the original caller hangs up or is otherwise disconnected, and a second call 1122, a random call, entering the system not through SCP 1102 but directly into switch 1120, goes to telephone 1162. This circumstance could occur in a number of different ways, including a misdialed or misrouted call. There are also other sequences of events that could result in the same mismatch between call and data. Unless some action is taken, the data will be retrieved and displayed, although there will no correspondence between the data and the caller.

In this circumstance the origination information, which may be such as caller ID information or DNIS information, for the second (random) call will not indicate the call originates at SCP 1102. In an embodiment of the present invention, origination data transmitted to T-Server 1114 at processor 1151 indicating the call last received was not through a valid SCP will cause any data being prepared for display at the agent station to be halted. In some embodiments, depending on the capability of switch 1120, T-Server 1114 on processor 1151 may cause such non-SCP calls to be disconnected and/or rerouted, by command over link 1119.

Voice Extensions Through Integrated Agent Workstations

The direct connection of a telephone to a PC connected on a LAN to a processor with an operating T-Server provides a platform for a number of voice extensions useful in the overall process of customer service through call-in centers. Several such voice extensions in embodiments of the present invention are described herein below.

Call recording is a major need in customer service operations of the sort described herein, especially in operations dealing with financial markets and utilities. Such recording operations in current art are typically quite expensive to implement and difficult to manage. In an embodiment of the present invention an improved call recording facility is provided by virtue of the connection of the telephone to the PC by data link, and the functionality afforded though LAN 1152 and code as a part of T-Server 1114. In this embodiment a digital voice rendition of both parties to a call is transmitted on link 163 (for example) to PC 1161.

In one embodiment of the present invention all calls are recorded, subject of course to local laws governing such matters, and provision is made for selective archiving of recorded conversations. The recording is all digital, and may be accomplished in a number of ways, utilizing a number of commercially available hardware and software entities, such as those marketed under the name SoundBlaster™. The LAN connection and availability of data servers such as server 1153 provide for the rather large amount of digital data needed for such a recording operation. In this embodiment organization of the recorded database can be done in a variety of ways, categorized by agent, by subject, by product, and so on, and relational cross-referencing may be done as well, providing a well of information not before available in such call-in centers. In addition interactive search and retrieve functionality, and interactive report generation is provided. In another embodiment of the invention digital voice recording is provided on demand, under control of the resident agent and/or the agent's supervisor. It will be apparent to those with skill in the art that there are many different schemes that may be employed for digital voice recording, using the uniquely connected and managed apparatus of the present invention.

In other embodiments of the present invention voice playback is provided, with pre-recorded massages played to a caller under agent or Host control. Such pre-recorded messages may be recorded by an agent or other person, and stored either locally in the PC or more remotely, such as on a server connected to LAN 152. Such messages can include greetings, mandatory messages required under law in some cases, disclaimers, and all kinds of messages that may be very repetitive for an agent.

In other embodiments of the present invention voice recognition routines are used allowing an agent to invoke displays with spoken initiators on the telephone, recognized in the PC and acted upon either in the PC or through the PC by means of LAN 1152 by other servers on the LAN or by T-Server 1114. Voice recognition may also be used to detect up-selling opportunities in the course of calls at PC connected telephones. Other voice recognition routines are used in embodiments of the invention to detect abusive or threatening speech, and to automatically save calls or portions of calls that match patterns for such speech.

Methods in Computer Simulation of Telephony Systems (3226)

The present invention in embodiments described below pertains to computer simulation of telephony call centers and activity and functionality of such centers, and to computer telephony integration (CTI) as applied to such centers. It is well-known in the art that call center architecture and functionality is a rich and varied subject, and it is beyond the scope of the present specification to describe all of the rich variation in call center technology. There are, however, commonalties. Every call center, for example, is centered on a telephony switch, either at a customer's premises or provided by a telephone company. The telephony switch involved in a call center typically has one or more incoming trunks of telephone channels for receiving telephone calls, and typically one or more outgoing trunks as well, for placing calls back into the network.

Also common to call centers is the fact of connections to telephones at agent stations, which are typically assigned directory numbers. There may be just a few, dozens or even thousands of agent stations controlled by a single call center. In some call centers, only telephones are provided at agent stations. In others there may be computer terminals with display monitors, and the computer terminals may be interconnected on a local area network (LAN) along with network servers of various sorts. Call centers have recently been developed for providing video conferencing with agents. It may be seen that the architecture can be quite varied.

Telephone switches at call centers, depending on the model and manufacture, are capable of certain functions in switching, such as Automatic Call Distribution (ACD), queuing, playing recorded announcements to callers, and much more, and typically the functions available, and the manner in which the functions operate is specific to the make and model of the telephony switch.

In addition to all of the above, the systems of interest for the present invention are systems having a CTI link capability, enabling connection of a processor executing one or more usually customer-specific applications. According to the reference incorporated above, CTI involves three areas: (1) Call Control, which includes an ability to control and observe telephony calls, switching features and status, automatic call distribution (ACD) systems and ACD agents, and to use switching resources including tone generators and detectors; (2) Telephone Control, which is an ability to control and observe telephone devices; and (3) Media Access which includes binding telephone calls to other media services.

In accomplishing the observation and control functions of CTI as listed above, applications executed on a CTI processor can be quite varied in function, really limited only to the imagination of application developers, and presently include such functions as agent-level routing, which will be familiar to those with skill in the art.

Figure 8:
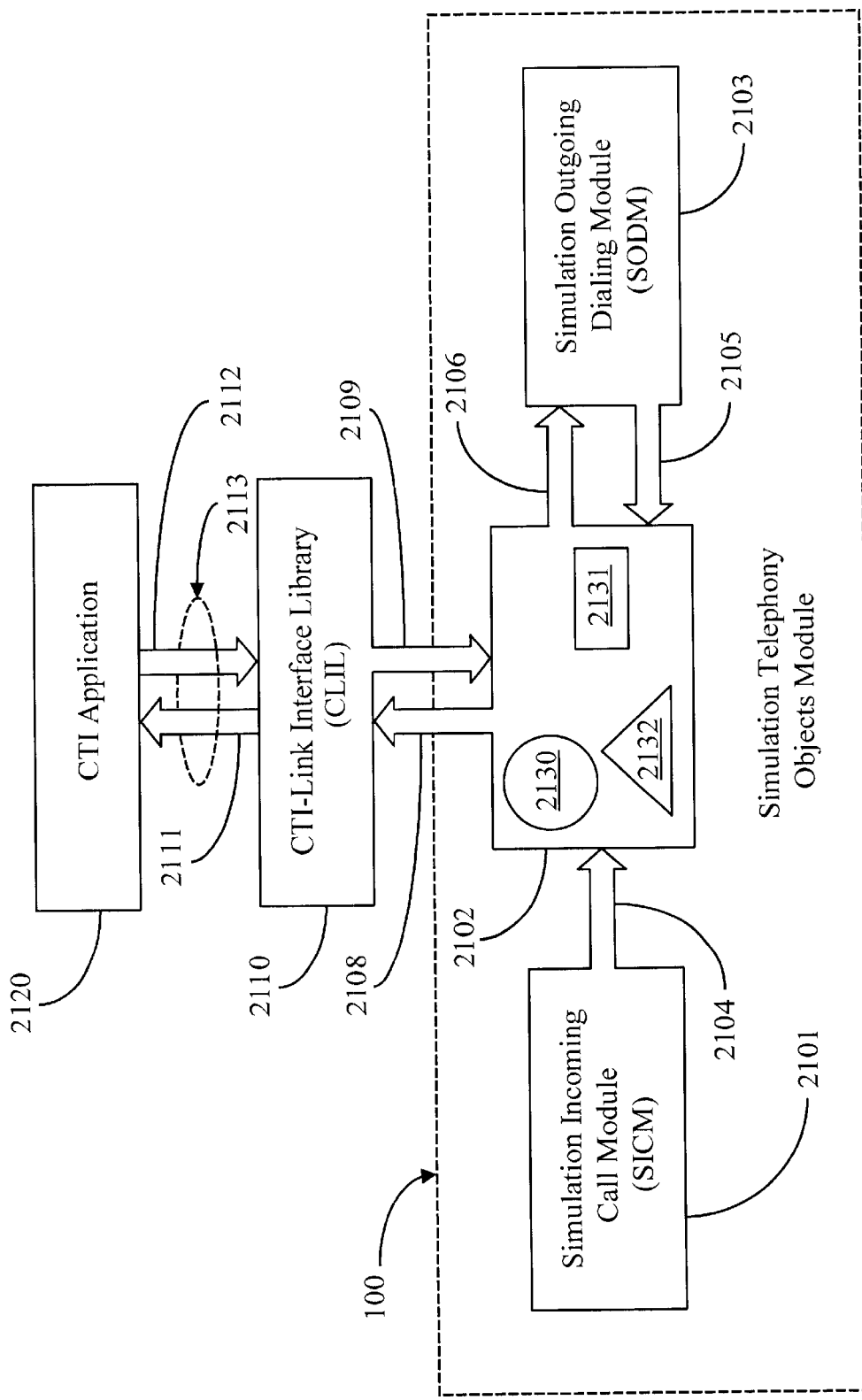
FIG. 8 is a block diagram depicting a simulated system according to a preferred embodiment of the present invention.

FIG. 8 is a block diagram depicting a simulated system according to a preferred embodiment of the present invention. In FIG. 8, boundary 2100 encloses software modules that emulate a call center and associated objects; boundary 21 10 represents a unique CTI Link Interface Library (CLIL); and boundary 2120 represents a CTI application. Each of the three broad elements introduced here is described in further detail below.

In simulating a call center and associated elements as represented in FIG. 8 by group 2100, it is necessary to simulate both physical and logical elements. These include, but are not necessarily limited to (a) agents telephones and stations, (b) ACD, (c) ACD groups, (d) ACD queues, (e) incoming trunks, (f) outgoing trunks, (g) abstractions of communication relationship between one or more devices, and (h) communication with user applications.

In the example of FIG. 8, call center group 2100 comprises a software module 2101, termed a Simulated Incoming Call Module (SICM), which emulates incoming calls via one or more trunks 2104 to a switch 2102. The SICM operates with an ACD list, and simulates calls to ACD groups.

Switch 2102 is termed in embodiments of the invention a Simulated Telephony Objects Module (STOM), and comprises a variety of micro-emulated objects represented here by elements 2130–2132, which represent such as agents, ACD queues, and the like, as listed above.

Agent's telephones and agent stations as micro-emulated objects in a call center simulation will have attributes and statuses including, but not necessarily limited to two-line connections; perhaps a group relationship; and an equipment configuration mode (status when call offered, and status when call released).

Other entities that may become micro-emulated objects in a call center module, as represented by elements 2130–2132 include such as an Interactive Voice Response (IVR)system, remote access agents, media services that may appear in a call center switch, and generally, any feature that a call center switch can perform. Outgoing trunks have parameters including but not limited to a list of the outgoing trunks and a probability of answer result, such as answer, not answer, busy, answering machine, fax/modem, SIT tones, and so forth.

Calls in the simulation procedure have attributes and parameters including but not limited to origination party; destination party; PBX call identifier, DNIS number, ANI, and call status, such as connecting, waiting, alerting, or conferencing.

Elements 2130–2132, represented here as icons, may be, as indicated above, any function or behavior associated with STOM 2102, and it will be apparent to those with skill in the art that the three elements shown are not enough to depict all physical and logical elements that would have to be provided for STOM 2102 to make a realistic simulation. The elements shown, however, will be sufficient to teach to practice of the invention to those with skill in the art.

Software module 2103 represents an outgoing and return module, termed a Simulated Outgoing Dialing Module (SODM), wherein calls placed by STOM 2102 over path 2106 are modeled, and calls returned as a function of the outgoing calls over path 2105 are also modeled. STOM 2102 communicates with Interface Library 2110 via paths 2108 and 2109. Link 2113 represents a CTI link from application 2120 to switch 2102 via CLIL 2110.

The STOM notifies an application 2120 through CLIL 2110 of arriving calls, and data associated with arriving calls, as well changing status of telephony objects and statuses. STOM 2102 receives requests from application 2120 via CLIL 2110 to change status of agents phones and stations, such as login, logout, ready, not ready, or and busy. Requests are also received to change call status, such as answer, reconnect, disconnect, produce new call, transfer call, and include a call to a conference. If requested changes are available the STOM produces the changes and sends notification o the changes to application 2120 through CLIL 2110. If requested changes are not available, negative notification is sent.

In the embodiment of the invention illustrated by FIG. 8, although several computer functions are represented that may in a real system, rather than an emulated system, be executed on separate but connected and intercommunicating processors, all of the system represented by FIG. 8 will be typically executed on a single, relatively powerful computer. The various elements represented are software modules written to intercommunicate, and to simulate the behavior of real telephony systems.

FIG. 8 is more than a block diagram representing a system of the invention. FIG. 8 also represents a user interface wherein the elements are objects represented on a graphical user interface (GUI) as icons. The system of the invention is adapted such that object elements may be selected from a library and interchanged into an interconnected system.

As an example of the object-oriented nature of the GUI of FIG. 8, attention is directed to SICM 2101. This software module is a micro-application that, when initiated and operating may simulate calls to STOM 2102. A master SICM is developed that includes all of the characteristics of incoming calls. The master module has input parameters that allow a user to configure the module for certain behavior of interest. As an example, it may be of interest to test an application running as element 2120 against a rush of Christmas shoppers placing calls within a certain time frame at a certain rate, with the calls statistically distributed for a range of products for which agents at the emulated call center are adapted to enter orders and schedule deliveries.

The matter of importance in describing this invention is not the particular nature or statistical distribution of the calls, but the fact that the module has alterable parameters, also known as properties, which a user may manipulate to represent behavior of interest, and that the module is adapted to the system as an object, which may be removed and replaced by another object having a different parameter set. One may then quickly and conveniently alter the incoming conditions for a simulation, and new modules with different parameter sets may be developed off line and switched into the system.

Attention is now directed to STOM 2102. Iconic elements 2130–2132 are shown as three different shapes in FIG. 1. Each of these elements is a micro emulated object having alterable parameters. Description of an agent object should be adequate to illustrate the nature of the invention in this aspect.

Consider that element 2130 is a micro emulated agent module. This module may be selected from a library in the fashion described above for the SICM module, and dragged and dropped into switch 2132. Either before or after addition to the switch, parameters for the module may be accessed and set. It will be apparent to those with skill in the art that there may be a large number of agents assigned to a single call center, and that all of the agents may not have the same assignments or characteristics.

As an example of the versatility of the unique system, there may be, for example, agents for English speakers who call, and agents who speak Spanish for handling calls from Spanish-speaking customers. Certain agents may be trained for certain functions: to sell certain products, for example, or to provide technical assistance in certain situations. There may be, however, multiple instances of a micro-emulated agent. For example, of a Spanish-speaking agent assigned to first shift duty and trained to sell three specific related products. An icon represented agent, then, will have a multiplicity parameter. In setting up a simulation a user may select an agent, set certain parameters, then set the multiplicity parameter so that the call center will behave as though there were, say, twenty such agents.

It will be apparent to those with skill in the art that there are several ways parameters may be accessed and set for a micro-emulated object, such as element 2130, which may, for example, represent an agent having particular attributes. In one embodiment, for example, a selected icon representing a micro-emulated object may be caused to display an associated window in the GUI, and the window will have programming fields wherein a user may access and alter (edit) parameters. If the object is an agent, there may be, for example, a parameter field for language, for product knowledge, for shift assignment, and so forth; and, as indicated above, there may also be a parameter for multiplicity. If a simulated agent having a complete set of behavior parameters is to be represented multiple times in a call center simulation, the multiplicity parameter may be set for "n" instances, then the object will behave in operation of the simulation as "n" objects. The behavior of such objects can be in preferred embodiments, randomized, so the behavior, where there is a range, is not always the statistical average.

For example, even though there may be multiple instances of an agent with a certain characterization, it will never be true that every such agent will behave in exactly the same way. Some of the agents may habitually come late or leave early, and others may take longer than others for processing after calls are released. In an aspect of the invention such variations are accounted for by access to a statistical database and random generator. Typically the statistical average behavior of all such agents will be known, and may be stored in a manner to be accessible to the system. Multiple agents, otherwise identical in behavior, are caused to randomly alter their behavior in a way that the statistical average behavior is met.

It will be apparent to those with skill in the art that the above description of agent functionality and variation, and the method of applying parameters, multiplicity, and statistical behavior is not necessarily limiting in the invention. Many variations are possible, even including programming an individual module for each an every agent in a setup of interest.

Attention is now directed to CLIL 2110 and communication between STOM 2102 and CLIL 2110. CLIL is an interface library whose function it is to translate between STOM 2102 and application 2120 in a particular manner. STOM 2102 is configured in a manner that will be common to any of the several makes and models of available telephony switches currently available. Different makes and models of telephony switches communicate with CTI applications in different ways, however, and provide significantly different behavior specific to a particular make and model of switch. Communication may also be characterized by latency considerations. For example, in some real world situations one might wish to test, the telephony switch will be on the customer's premises, and in others, the telephony switch might be in the network, remote from the customer's premises. Latency issues in communication will differ by the different switch location, even with the same physical switch.

CLIL is a switch-dependent layer that controls communication of commands and status over data paths 2108/2109 and CTI link 2113. The function of CLIL 2110 is to add switch dependent characteristics to the communication, so one simulated generic call center can be made to appear to a CTI application as a particular make and model of a switch connected in a specific manner. The particular value of CLIL 2110 is that an application may be tested against one make and model of a switch, and, by selecting a different layer of software from CLIL 22110, one may then test the same CTI application against a different make and model of switch and/or location and connectivity of a switch user may quickly and conveniently substitute one CLIL setup for another for communication with a switch of interest.

Internet Protocol Network Telephony (IPNT)

In all of the embodiments and aspects of the invention described above specific example have been drawn from the technological area of conventional intelligent telephony networks, other than what is now known as Internet protocol network telephony, wherein computers simulate telephones through software, microphones, and speakers, and telephony data between such equipped computers is transmitted over Internet connections and directed by servers, such as destination number servers (DNS) in the Internet. In the IPNT world IP addresses are used instead of telephone numbers, and there are differences in the way data packets are formulated and transmitted. Moreover, what may be termed routing is done by such as IP switches and hubs, wherein destination addresses may be changed. These differences, however, are not limiting in embodiments of the present invention.

In many embodiments of the invention described, the inventions are involved with new and unique ways to use machine intelligence for telephony functions, particularly, but not exclusively, as these functions relate to call centers and intelligent routing of calls. In instances of the invention described, the principles of the invention may also be applied to IPNT without undue experimentation.

As examples of IPNT application, in those embodiments dealing with personal routing and personal routers, the methods and apparatus described may also be adapted to IPNT so personal routing rules, negotiation, and the like may be provided for IPNT calls as well. In the aspects of the invention dealing with simulation of CTI applications and testing, the applications may apply to IPNT telephony as well as to more conventional telephony systems. Other examples will be apparent to those with skill in the telephony arts.

It will be apparent to those with skill in the art that there are many alterations that may be made in the embodiments of the invention herein described without departing from the spirit and scope of the invention. Some of these have been described above, such as the use of a telephony server like T-Server 1207 running on processor 1223. In some cases such a server is not needed to practice the invention, as was described above.

Many of the functional units of the system in embodiments of the invention may be implemented as code routines in computerized telephony equipment, computer servers, and individual workstations. It is well-known that programmers are highly individualistic, and may implement similar functionality by considerably different routines. Also, the invention may be applied to widely varying hardware systems. Further, hardware used to practice the invention may vary in many ways. There are similarly many other alterations in the embodiments described herein which will fall within the spirit and scope of the present invention in it's several aspects described. The invention is limited only by the breadth of the claims below.

What is claimed is:

1. A telephony call center, comprising:

a plurality of agent stations, individual ones of the agent stations having a telephone connected to a telephone trunk from a telephony network level Service Control Point (SCP) and also having a computer platform;

a local area network (LAN) connecting at least some of the computer platforms at the agent stations;

a processor connected on the LAN having both a connection to an Internet network for Internet Protocol Network Telephony (IPNT) and a data link to the SCP separate from the telephone trunk; and a Telephone Application Programming Interface (TAPI)-compliant bridge circuit between the telephone and the computer platform in individual ones of the agent stations;

wherein the call center receives conventional telephone calls from the conventional telephony network from the SCP, and also receives IPNT calls from the Internet, separate from the conventional telephony network, at the Internet connection, and distributes both the IPNT calls and conventional calls to the agent stations based on the status of agents at the computer platforms determined by the processor monitoring both the status of agents handling both conventional calls received at agent station telephones and IPNT calls received at the Internet connection, and wherein, at an agent workstation having the TAPI-compliant bridge, an agent may utilize the telephone in interacting with an IPNT call routed to the computer platform at the agent workstation.

2. The call center of claim 1 wherein the TAPI-compliant bridge is used to monitor telephone status and activity by the computer workstation, which may report the monitored status and activity on the LAN to the processor on the LAN having an Internet connection.

3. The call center of claim 2 wherein the processor having the Internet connection may report status at the call center to a router at network level.

4. The call center of claim 1 further comprising a data server connected on the LAN, the data server comprising a caller database, wherein data associated with incoming calls is used as a key to retrieve data associated with callers from the caller database, and the data is displayed on video display units (VDUs) of the computer platforms at individual agent workstations.

5. The call center of claim 4 further comprising agent scripts stored in a database, and displayed on agent's VDUs according to data associated with incoming calls.

* * * * *

UNITED STATES PATENT AND TRADEMARK OFFICE
CERTIFICATE OF CORRECTION

PATENT NO.        : 6,359,981 B1
APPLICATION NO.   : 08/950253
DATED             : March 19, 2002
INVENTOR(S)       : Igor Neyman Page 1 of 1

It is certified that error appears in the above-identified patent and that said Letters Patent is hereby corrected as shown below:

On the Title Page:

Please replace item (60) under the Related U.S. Application Data with the following:

Related U.S. Application Data
(60) Division of application No. 08/928,861, filed on Sep. 12, 1997, now Pat. No. 7,031,442, which is a continuation-in-part of application No. 08/869,815, filed on Jun. 4, 1997, now Pat. No. 6,148,074, which is a continuation-in-part of application No. 08/802,667, filed on Feb. 19, 1997, now Pat. No. 6,201,863, which is a continuation-in-part of application No. 08/797,420, filed on Feb. 10, 1997, now Pat. No. 6,185,291; this application is also a continuation-in-part of application No. 08/833,340, filed on Apr. 3, 1997, now Pat. No. 6,560,328, and a continuation-in-part of application No. 08/891,675, filed on Jul. 9, 1997, now Pat. No. 6,205,412.

In the Specification:

Please replace the CROSS-REFERENCE TO RELATED DOCUMENTS with the following:

CROSS REFERENCE TO RELATED DOCUMENTS
The present application is a Divisional application of copending patent application Ser. No. 08/928,861, filed Sep. 12, 1997, now Pat. No. 7,031,442, which is a Continuation-In-Part (CIP) of prior copending patent application Ser. No. 08/869,815, filed Jun. 4, 1997, now Pat. No. 6,148,074, which is a CIP of copending application Ser. No. 08/802,667, filed Feb. 19, 1997, now Pat. No. 6,201,863, which is a CIP of copending patent application Ser. No. 08/797,420, filed Feb. 10, 1997, now Pat. No. 6,185,291. The present application is also a CIP of copending application Ser. No. 08/833,340, filed on April 3, 1997, now Pat. No. 6,560,328, and a CIP of a copending application having an application Ser. No. 08/891,675, filed Jul. 9, 1997, now Pat. No. 6,205,412, titled "Methods in Computer Simulation of Telephony Systems."

Signed and Sealed this
Sixteenth Day of December, 2014

Michelle K. Lee
*Deputy Director of the United States Patent and Trademark Office*